United States Patent
Schuster

(10) Patent No.: US 7,266,599 B2
(45) Date of Patent: Sep. 4, 2007

(54) FACILITATING LOCATION OF A NETWORK DEVICE VIA A HUMAN-SENSIBLE LOCATION INDICATION

(75) Inventor: Paul Schuster, Radlett (GB)

(73) Assignee: Intel Corporation, Santa Clara, CA (US)

( * ) Notice: Subject to any disclaimer, the term of this patent is extended or adjusted under 35 U.S.C. 154(b) by 781 days.

(21) Appl. No.: 10/330,906

(22) Filed: Dec. 27, 2002

(65) Prior Publication Data

US 2004/0128373 A1   Jul. 1, 2004

(51) Int. Cl.
*G06F 15/16* (2006.01)

(52) U.S. Cl. .................. 709/223; 709/224; 710/17

(58) Field of Classification Search ........ 709/220–223, 709/224; 370/252, 242, 245; 710/1–5, 8, 710/17–19, 62
See application file for complete search history.

(56) References Cited

U.S. PATENT DOCUMENTS 6,225,708 B1 *   5/2001   Furukawa et al. ............ 307/66
6,915,339 B2 *   7/2005   Hartman et al. ............. 709/220
2002/0172193 A1 *  11/2002   Preston et al. .............. 370/352
2002/0181446 A1 *  12/2002   Preston et al. .............. 370/352
2003/0217187 A1 *  11/2003   Kuiken ........................ 709/250
2004/0039855 A1 *   2/2004   Bohrer et al. ................. 710/62

OTHER PUBLICATIONS

G. Fairhurst. "Address Resolution Protocol (ARP)". Accessed from: http://erg.abdn.ac.uk/users/gory/course/inet-pages/arp.html on Apr. 11, 2006.*
Miller, Mark. "Managing internetworks with SNMP : the definitive guide to the Simple Network Management Protocol (SNMP) and SNMP version 2". New York, N.Y. : M & T Books, c1993. pp. 3-5.□□.*

* cited by examiner

*Primary Examiner*—Moustafa Meky
(74) *Attorney, Agent, or Firm*—Buckley, Maschoff & Talwalkar LLC

(57) ABSTRACT

According to some embodiments, location of a network device is facilitated via a human-sensible location indication. For example, a location indication request may be received at a network interface card of a personal computer. In response to the request, a human-sensible location indication may then be provided from the network interface card.

9 Claims, 5 Drawing Sheets

FACILITATING LOCATION OF A NETWORK DEVICE VIA A HUMAN-SENSIBLE LOCATION INDICATION

BACKGROUND

Network or Information Technology (IT) personnel may sometimes need to physically access a network device. For example, a network administrator may need to access a Personal Computer (PC) that is connected to an office network. The network administrator may want to, for example, re-boot a PC that is not operating properly (e.g., when the PC has hung up). Similarly, the network administrator might need to perform other hardware or software maintenance, repair, replacement, and/or upgrade functions.

In order to physically locate a network device, it is known that a database can be manually created and updated. For example, a logbook or spreadsheet might list each PC in an office network along with a notation that reflects the physical location of that PC (e.g., "PC101—Fourth Floor, Bob's Office"). As another approach, the physical location of network device can be tracked using a naming convention along with an appropriate label on each device (e.g. "Sales_Department_3rd_Floor" to indicate a general area where a printer is located).

These approaches, however, have a number of disadvantages. For example, creating and manually updating a database and/or device labels can be a time consuming task, especially when a network includes a large number of devices. In addition, the approaches are prone to error, such as mistakes that can occur during data entry. Similarly, an employee might move a network device to another location without informing the network administrator (e.g., when the device communicates via a wireless network). Moreover, it might be difficult to find a particular network device even when the information is correct. For example, a PC could be hidden under a desk or there might be a large number of network devices in a general area (e.g., the network device could be one disk drive in a dense array of disk drives).

As another approach, a tracking system, such a Global Positioning System (GPS) or Infra-Red (IR) system, can help determine the physical location of a network device. The cost of such a tracking system, however, can make the approach impractical (especially when a network includes a large number of devices).

DETAILED DESCRIPTION

Some embodiments described herein are associated with a "network device." As used herein, the phrase "network device" may refer to any device that can communicate via a network. Examples of network devices include a PC, a workstation, a server, a printer, a scanner, a facsimile machine, a copier, a Personal Digital Assistant (PDA), a storage device (e.g., a disk drive), a hub, a router, a switch, and a communication device (e.g., a modem).

Moreover, some embodiments are associated with a "network administrator." As used herein, the phrase "network administrator" may refer to any person that monitors, maintains, or is otherwise associated with a network and/or network devices. One example of a network administrator is an IT employee who resolves network user problems (e.g., a help desk operator).

System

Figure 1:
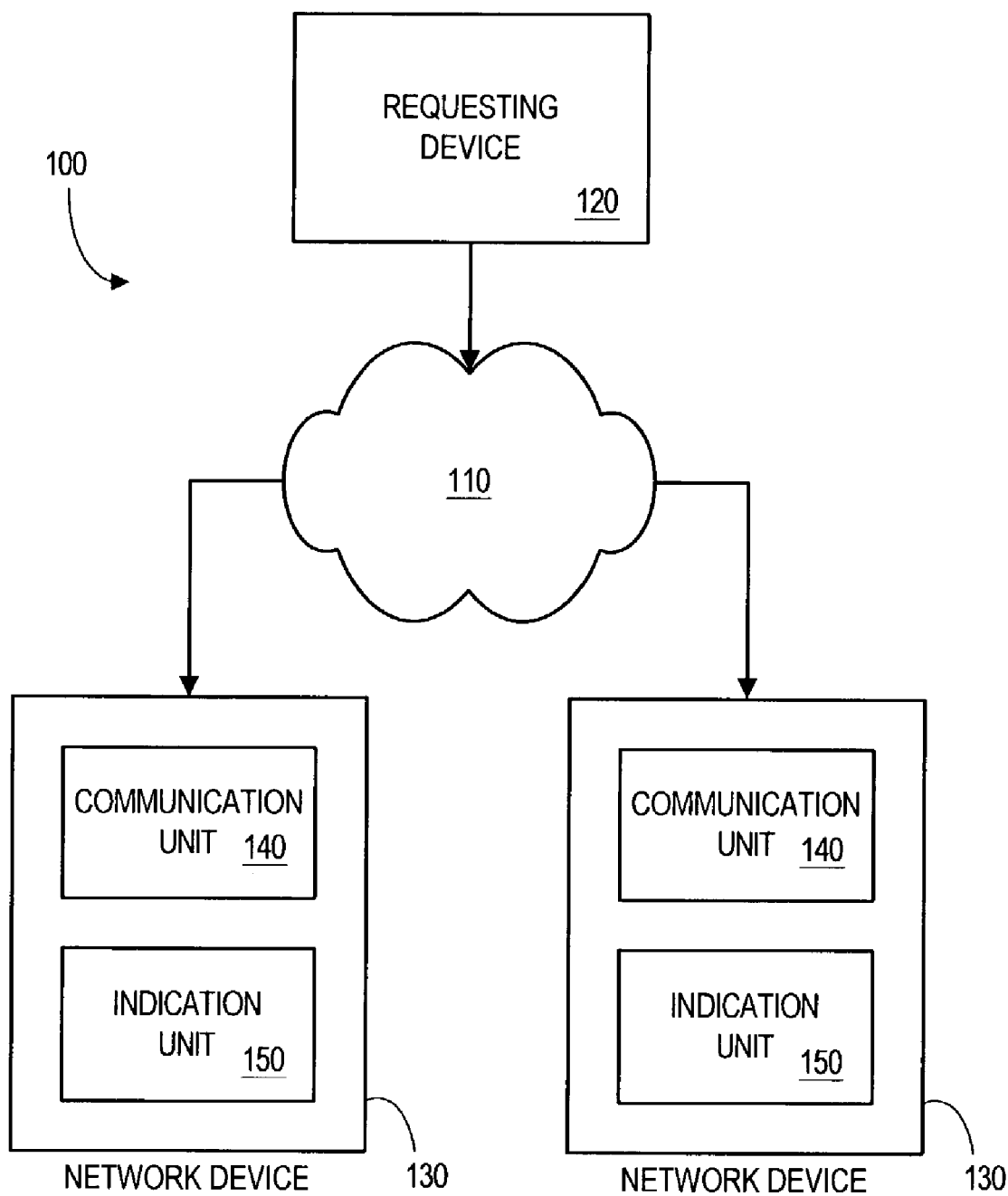
FIG. 1 is a block diagram of a system according to some embodiments.

Turning now in detail to the drawings, FIG. 1 is a block diagram of a system 100 according to some embodiments. In particular, the system 100 includes a network 110, such as a Local Area Network (LAN), a Metropolitan Area Network (MAN), a Wide Area Network (WAN), a proprietary network, a wireless network, and/or an Internet Protocol (IP) network (e.g., an intranet). Note that the network 110 might include a number of different networks.

According to some embodiments, a requesting device 120 transmits information to a network device 130 via the network 110. For example, the requesting device 120 and/or a network device 130 might exchange information in accordance with the Fast Ethernet LAN transmission standard 802.3-2002® published by the Institute of Electrical and Electronics Engineers (IEEE). Moreover, the exchanged information might be associated with a network management protocol that enables governing and/or monitoring of network devices 130. For example, the exchanged information might be associated with the Simple Network Management Protocol (SNMP) as defined by the Internet Engineering Task Force (IETF) Request For Comment (RFC) 1157 (1990). The requesting device 120 may be any device capable of performing the functions described herein, such as a PC or PDA associated with a network administrator.

According to some embodiments, a network device 130 includes a communication unit 140 to receive information from the network 110 and an indication unit 150 to provide a human-sensible indication (e.g., an audible or visual indication). The network device 130 may be any device capable of performing the functions described herein, such as a PC connected to the network 110. Note that the communication unit 140 and/or the indication unit 150 might be included within the network device 130 (e.g., as an internal card) or may instead be an external device coupled to the network device 130.

Methods

Figure 2:
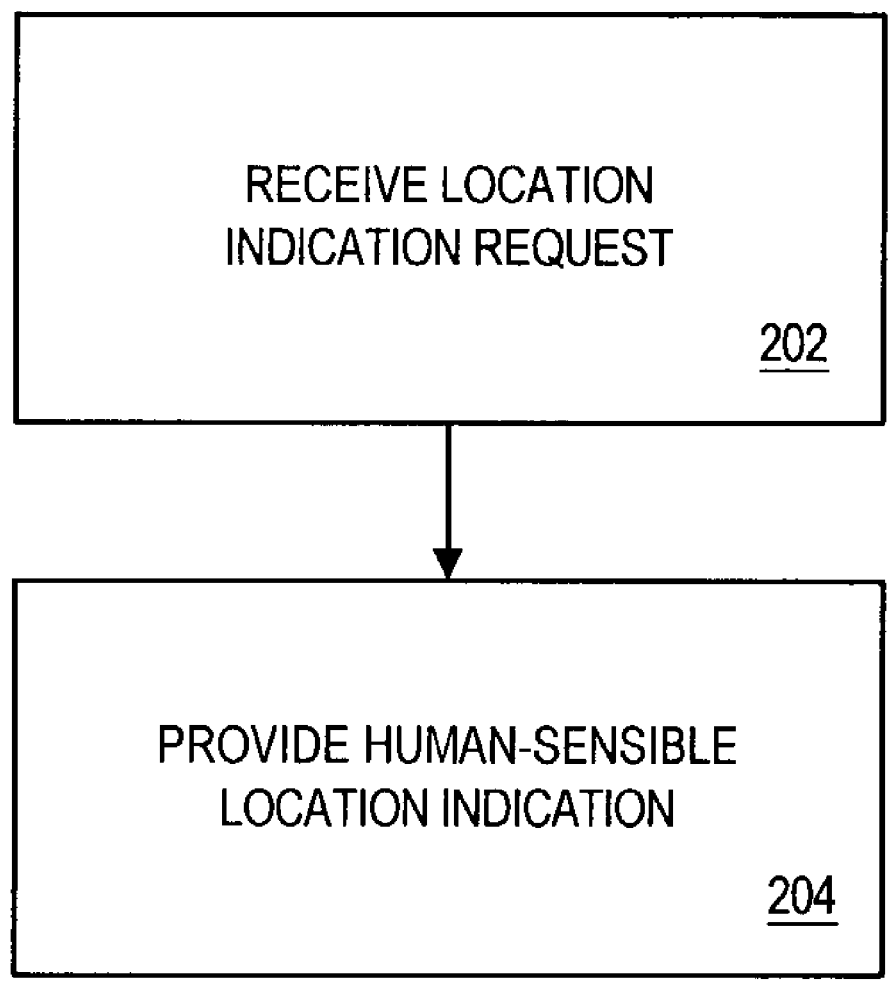
FIG. 2 is a flow chart of a method of providing a human-sensible location indication according to some embodiments.

FIG. 2 is a flow chart of a method for providing a human-sensible location indication according to some embodiments. The flowchart in FIG. 2 and the other figures described herein do not imply a fixed order of steps, and embodiments may be practiced in any order that is practicable. The method may be associated with, for example, a network device 130 as illustrated in FIG. 1.

At 202, a location indication request is received by a communication unit 140 associated with a network device 130. The communication unit 140 (or the indication unit 150) may also determine that a human-sensible location indication should be provided in response to the request. For example, the request might be received via a network protocol frame that includes a Media Access Control (MAC) address. In this case, the communication unit 140 (or the indication unit 150) could compare the MAC address in the request with a MAC address that is associated with the network device 130 in order to determine if an indication should be provided.

At 204, a human-sensible location indication is provided by the indication unit 150. For example, the indication unit 150 might activate a speaker (e.g., by generating a beep or tone) and/or a Light Emitting Diode (e.g., by turning on or flashing the LED). The human-sensible location indication may be an audible, visual, or any other human-sensible indication.

Figure 3:
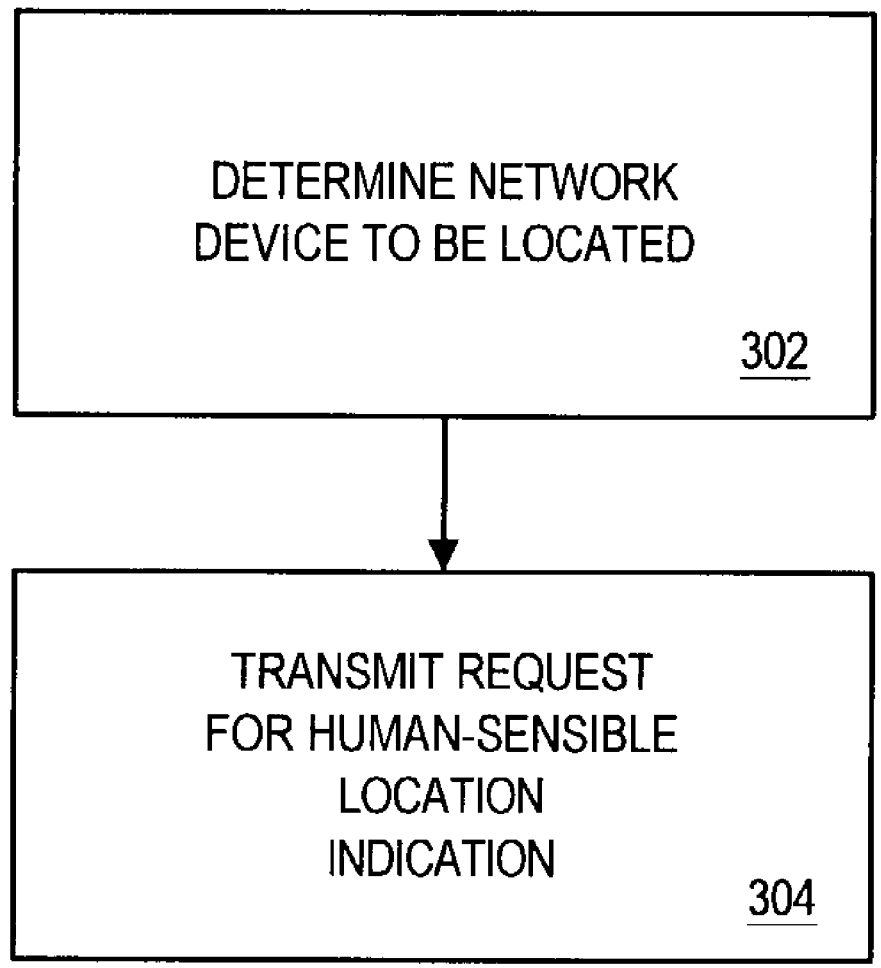
FIG. 3 is a flow chart of a method of requesting a human-sensible location indication according to some embodiments.

FIG. 3 is a flow chart of a method of requesting a human-sensible location indication according to some embodiments. The method may be associated with, for example, a requesting device 120 as illustrated in FIG. 1.

At 302, a network device 130 to be located is determined. The determination of the network device 130 might comprise, for example, a network administrator entering a device name or identifier (e.g., via a keyboard associated with the requesting device 120). The determination of the network device 130 might instead be performed by a network management program executing on the requesting device 120. For example, the network management program might generate a list of all PCs that have not had a virus definition list updated within the last two weeks (e.g., because the PCs have been hung-up or have not been turn on during the last two weeks).

At 304, a request for a human-sensible location indication is transmitted. For example, the requesting device 120 might transmit via the network 110 a network management frame that includes a MAC address associated with the determined network device 130. Note that a number of different requests might be transmitted (e.g., a network administrator might want to physically locate three different PCs at the same time). Moreover, the request might be transmitted to a single network device 130 or might instead be broadcast to all network devices 130. Similarly, the request might be transmitted directly from the requesting device 120 to the network device 130 or it may instead pass through one or more other devices (e.g., a network management server).

Network Interface Card Example

Figure 4:
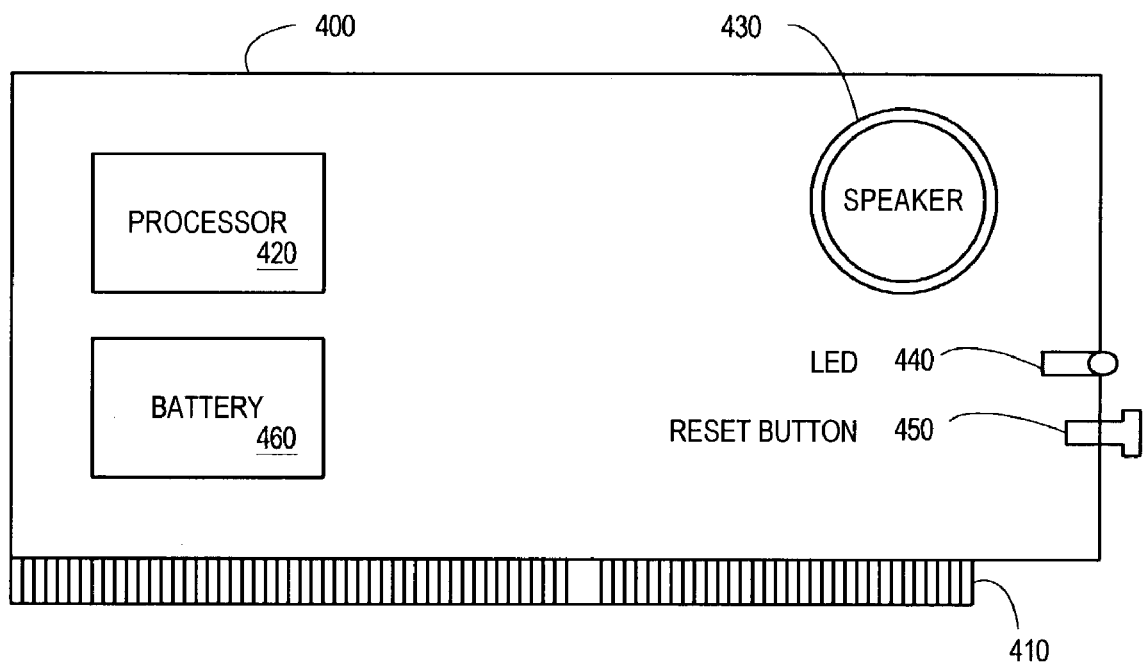
FIG. 4 illustrates a network interface card according to one embodiment.

According to some embodiments, the communication unit 140 and the indication unit 150 are associated with a computer circuit board or card installed in a network device 130 to enable communication with the network 110. For example, FIG. 4 illustrates a Network Interface Card (NIC) 400 that may be installed in a PC according to one embodiment. The NIC 400 includes a number of input and output paths 410 that can be used to exchange information with, for example, the network 110 and/or other portions of the PC.

According to this embodiment, the NIC 400 includes built-in network management protocol implementation software and/or hardware (e.g., associated with a processor 420) adapted to receive and identify a location indication request from the network 110. Moreover, the NIC 400 includes a speaker 430 (e.g., a buzzer) and a LED 440 that can provide a human-sensible indication. For example, the processor 420 might activate the speaker 430 and/or the LED 440 when a particular type of network protocol frame is received from the requesting device 120 (e.g., a frame indicating that a location indication has been requested).

According to some embodiments, the NIC 400 also includes a reset button 450. For example, a network administrator might use to reset button 450 to turn off the speaker 430 and/or the LED 440 after he or she physically locates the associated PC.

According to some embodiments, the NIC 400 also includes a battery 460 that lets the NIC 400 receive and process location indication requests (and activate the speaker 430 and the LED 440 as appropriate) even when power is not applied to the PC. In this way, the PC can still be located when the PC is turned off. According to other embodiments, power is instead received through an external power supply (e.g., via a network connection, a back-up power supply unit, or a separate plug to an electrical outlet).

Figure 5:
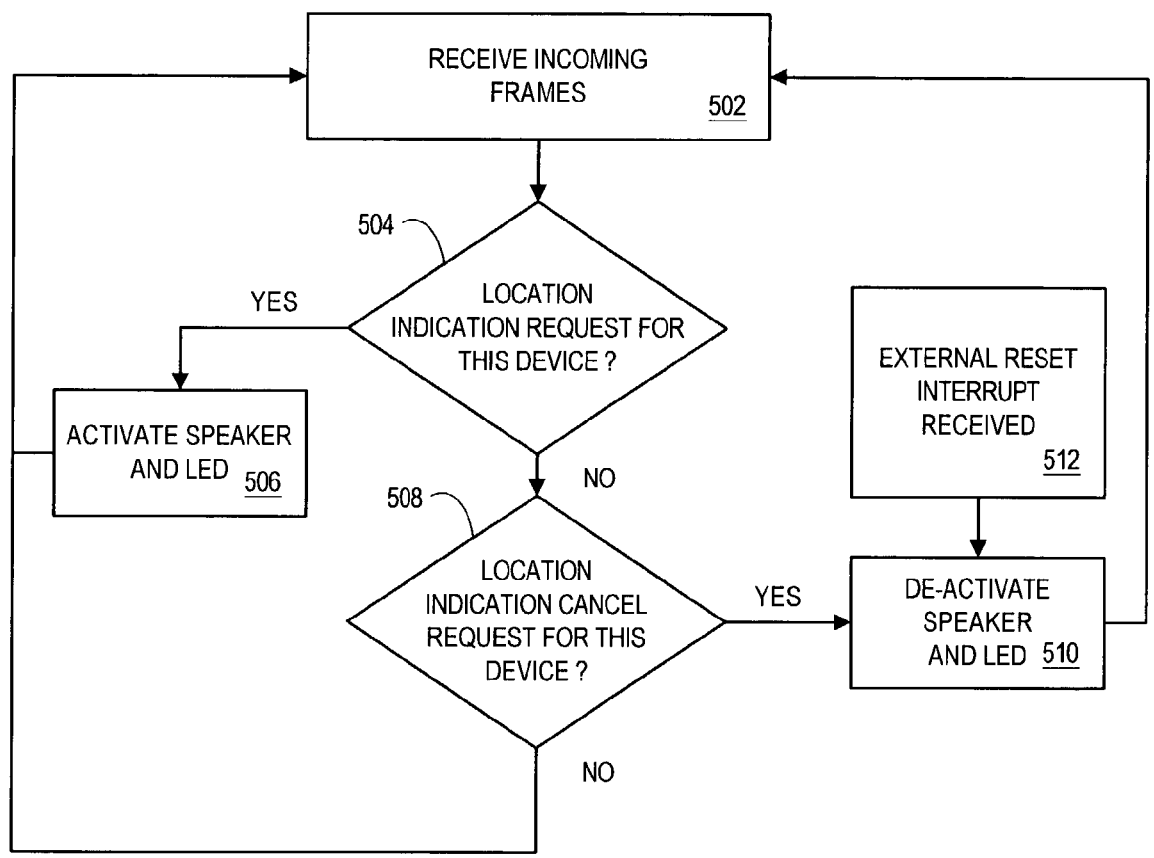
FIG. 5 is a flow chart of a method to facilitate location of a network device according to one embodiment.

FIG. 5 is a flow chart of a method to facilitate location of a network device according to one embodiment. The method may be associated with, for example, the NIC 400 described with respect to FIG. 4.

At 502, the NIC 400 receives incoming network protocol frames. The incoming frames may originate, for example, from other network devices 130 or a requesting device 120. According to some embodiments, the built-in network management implementation software of the NIC 400 then processes the incoming frames. As a result, the NIC 400 may identify (and respond to) a location indication request even when the host PC is not operating correctly, such as when the Operating System (OS) has crashed.

If the incoming frame is a "location indication request" directed to the network device at 504, the speaker 430 and the LED 440 are activated at 506. Note that each NIC 400 may have a hardware address that uniquely identifies it in the network 110, such as a MAC address (e.g., burned into the NIC 400) or a Data Link Control (DLC) address. The process then continues at 502 (e.g., to determine if the speaker 430 and the LED 440 should be de-activated).

If the incoming frame is instead a "location indication cancel request" directed to the network device at 508, the speaker 430 and the LED 440 are de-activated at 510. The process then continues at 502 (e.g., to await another location indication request).

An external reset interrupt received at 512 (e.g., generated when a network administrator activates the reset button 450) will also cause the speaker 430 and the LED 440 to be de-activated at 510 (e.g., because the network administrator has physically located the PC). According to other embodiments, the speaker 430 and the LED 440 are automatically de-activated after a pre-determined period of time (e.g., three minutes).

Thus, some embodiments of the present invention may help a network administrator physically locate a network device (e.g., he or she can simply trace the origin of the human-sensible location indication). Moreover, some embodiments may be implemented in an inexpensive fashion (e.g., by including a simple buzzer or LED on a NIC).

ADDITIONAL EMBODIMENTS

The following illustrates various additional embodiments. These do not constitute a definition of all possible embodiments, and those skilled in the art will understand that many other embodiments are possible. Further, although the following embodiments are briefly described for clarity, those skilled in the art will understand how to make any changes, if necessary, to the above description to accommodate these and other embodiments and applications.

For example, although some embodiments have been described with respect to a fixed human-sensible location indication (e.g., an audible and/or visual indication), according to other embodiments the network administrator selects the type of indication he or she desires. This information may then be included in the network management frame that is transmitted from the requesting device 120 to the network device 130, and the network device 130 can respond as appropriate.

Moreover, some embodiments have been described with respect to a location indication request associated with a single device in a network. According to other embodiments, however, a single location indication request can be associated with a number of different devices. For example, a single location indication request might include three different device identifiers. According to still other embodiments, a single node in a network might be associated with a number of different devices (e.g., a PC, an internal graphics card and storage device, and an external printer). In this case, a location indication request might be directed to the entire node or to a device within the node. Similarly, one or more devices within the node might actually provide the location indication.

In addition, some embodiments described herein are associated with a location indication that is transmitted on an "as-needed" basis (e.g., when requested by a network administrator). According to other embodiments, however, such a request may be transmitted on a periodic basis (e.g., a location indication request status might be transmitted once every ten seconds to indicate whether or not a location request should be provided).

Although particular network devices and indication units have been described, other types of devices and units may also be associated with embodiments of the present invention. For example, a Liquid Crystal Display (LCD) on a printer or copier might provide a human-readable location indication (e.g., a text message). Similarly, a telephone coupled to a PC might ring or flash an LED to provide a location indication.

The several embodiments described herein are solely for the purpose of illustration. Persons skilled in the art will recognize from this description other embodiments may be practiced with modifications and alterations limited only by the claims.

What is claimed is:

1. A method, comprising:
   receiving a location indication request at a network interface card of a personal computer, the location indication request being received from a remote network device;
   providing from the network interface card a human-sensible location indication in response to the request;
   receiving at the network interface card a location indication cancel request, the location indication cancel request being received from the remote network device and being associated with the indication provided in response to the location indication request; and
   ceasing to provide the human-sensible location indication in response to the cancel request.

2. The method of claim 1, further comprising:
   receiving network management protocol frames; and
   identifying a received frame directed to at least one of the personal computer and the network interface card.

3. The method of claim 2, wherein the network management protocol comprises simple network management protocol.

4. The method of claim 2, wherein said identifying comprises:
   comparing a media access control address in the received frame to a media access control address associated with at least one of the personal computer and the network interface card.

5. The method of claim 1, wherein the location indication is provided via a light-emitting diode of the network interface card.

6. The method of claim 1, wherein said providing is performed even when the personal computer is unable to communicate with the network interface card.

7. A computer readable medium storing instructions adapted to be executed by a processor to perform a method, said method comprising:
   receiving a location indication request at a network interface card of a personal computer, the location indication request being received from a remote network device;
   providing from the network interface card a visual location indication in response to the request;
   receiving at the network interface card a location indication cancel request associated with the location indication request, the location indication cancel request being received from the remote network device; and
   ceasing to provide the visual location indication in response to the cancel request.

8. An apparatus, comprising:
   a communication unit of a network interface card to receive, from a remote network device a location indication request via a network; and
   an indication unit of the network interface card to provide a visual location indication in response to the request, wherein the communication unit is farther to receive a location indication cancel request from the remote network device and wherein, in response to the cancel request, the indication unit is to cease to provide the visual location indication.

9. The apparatus of claim 8, further comprising:
   a battery to power the communication unit and the indication unit.

* * * * *